United States Patent
Hickson et al.

(10) Patent No.: US 8,631,418 B2
(45) Date of Patent: Jan. 14, 2014

(54) SYSTEM AND METHOD FOR MESSAGING

(75) Inventors: Andrew Ian Hickson, West Wellow (GB); Brian Clive Homewood, Winchester (GB); Tristram Terence Reilly, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 2641 days.

(21) Appl. No.: 11/297,550

(22) Filed: Dec. 8, 2005

(65) Prior Publication Data

US 2006/0140362 A1    Jun. 29, 2006

(30) Foreign Application Priority Data

Dec. 14, 2004   (GB) .................................. 0427305.8

(51) Int. Cl.
 *G06F 3/00*   (2006.01)
(52) U.S. Cl.
 USPC ........................................................ 719/314
(58) Field of Classification Search
 USPC ................................................. 719/313, 314
 See application file for complete search history.

(56) References Cited

U.S. PATENT DOCUMENTS

| | | | | |
|---|---|---|---|---|
| 4,953,204 A | * | 8/1990 | Cuschleg et al. | 379/266.05 |
| 5,734,986 A | * | 3/1998 | Helders | 455/525 |
| 6,058,389 A | * | 5/2000 | Chandra et al. | 707/1 |
| 6,169,748 B1 | * | 1/2001 | Barbas et al. | 370/468 |
| 7,493,623 B2 | * | 2/2009 | Ruutu | 719/314 |
| 2003/0041178 A1 | | 2/2003 | Brouk et al. | 709/313 |
| 2005/0080759 A1 | * | 4/2005 | Brown et al. | 707/1 |

OTHER PUBLICATIONS

Thomas R. Henderson, Host Mobility for IP Networks: A Comparision, 2003.*

* cited by examiner

*Primary Examiner* — Lechi Truong
(74) *Attorney, Agent, or Firm* — Steven Greenberg, Esq.; Carey, Rodriguez, Greenberg & O'Keefe

(57) ABSTRACT

A system and method for messaging in which, when a connection to a queue manager (220) is established, the queue manager allocates a Connection Identifier from the same name space (300) as Message Identifiers and returns this information (400) to the user. The user can then use this Connection Identifier as a Correlation Identifier, safe in the knowledge that it will not clash with any system generated Message Identifier or Correlation Identifier. A secondary benefit to this allocation scheme is that if a shared reply queue suffers from a build-up of messages then the Correlation Identifier in those messages can be used to identify the application expected to receive those messages.

16 Claims, 3 Drawing Sheets

SYSTEM AND METHOD FOR MESSAGING

FIELD OF THE INVENTION

This invention relates to a messaging system and method.

BACKGROUND OF THE INVENTION

It is known that in the messaging environment provided by WebSphere® MQ Messaging Software from IBM®, messages are commonly identified by a system generated Message Identifier and a user generated Correlation Identifier. Programs connecting to the messaging system are allocated a handle (e.g., 'hConn', a common handle to a server connection) through which they reference the messaging system and optionally a Connection Identifier that can be used by a third party to identify a specific connection. It is common for Message Identifiers and Correlation Identifiers to share the same name space, thus making it possible for the system generated Message Identifier in a request message to be copied into the Correlation Identifier of any corresponding response message. This design can present the user with the problem of generating Correlation Identifiers that are guaranteed not to clash with the system generated Message Identifiers.

From patent publication US2003/0041178A1 there is known a technique for routing messages between applications in which a message identifier and a session identifier are used. However, in this publication there is no relationship between these two identifiers.

It is relatively common for users to want to allocate a single unique identifier to correlate all messages associated with a single connection (for example so that a reply queue can be shared by multiple users), and one way to allocate such an identifier in WebSphere® MQ (formerly MQSeries™) Messaging Software from IBM® is to issue a pair of 'MQPUT' and 'MQBACK' calls, causing the system to generate a unique message identifier.

However, this approach has the disadvantage(s) that although issuing a 'MQPUT/MQBACK' call sequence causes the system to generate a unique message identifier, it causes the message with that identifier to never be visible outside the connection issuing the calls.

A need therefore exists for a system and method for messaging wherein the abovementioned disadvantage(s) may be alleviated.

STATEMENT OF INVENTION

In accordance with a first aspect of the present invention there is provided system for messaging as claimed in claim 1.

In accordance with a second aspect of the present invention there is provided system for messaging as claimed in claim 6.

BRIEF DESCRIPTION OF THE DRAWING(S)

One system and method for messaging incorporating the present invention will now be described, by way of example only, with reference to the accompanying drawings, in which.

DESCRIPTION OF PREFERRED EMBODIMENT(S)

Figure 1:
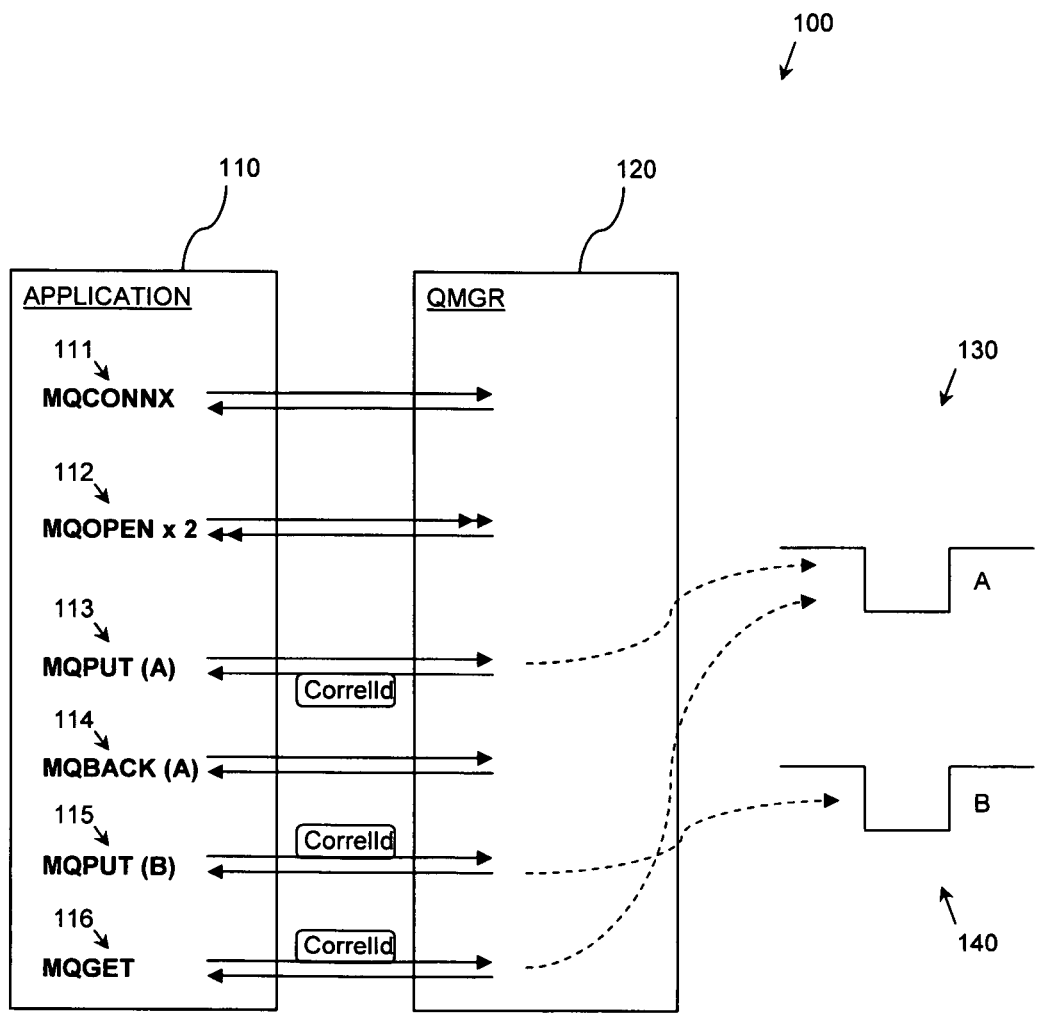
FIG. 1 shows a block-schematic illustration of a known, prior art method of generating a unique message identifier.

Referring firstly to FIG. 1, a known technique for generating a unique message identifier in a message queueing messaging system such as a WebSphere®. MQ (formerly MQSeries™) Messaging System 100 relies on communication between an application module 110 and a queue manager module QMGR 120. The application module 110 initially sends an MQCONNX call 111 to (and receives an appropriate confirmation response from) the QMGR module 120. The application module 110 sends two MQOPEN calls 112 to (and receives appropriate confirmation responses from) the QMGR module 120. The application module 110 then sends an MQPUT call 113 to (and receives an appropriate confirmation response from) the QMGR module 120; the MQPUT call 113 (made under syncpoint, as well known) is directed to put data on a queue A 130 (e.g., a shared reply queue) and results in a unique identifier CorrelId being returned to the client. The application module 110 then sends an MQBACK call 114 to (and receives an appropriate confirmation response from) the QMGR module 120; the effect of the MQBACK call 114 is to back out the previous MQPUT call 113. The application module 110 then sends an MQPUT call 115 to (and receives an appropriate confirmation response from) the QMGR module 120; the MQPUT call 115 is directed to put data on a queue B 140. The application module 110 then sends an MQGET call 116 to (and receives an appropriate confirmation response from) the QMGR module 120; the MQGET call 116 is directed to get data from the queue A 130. It will be understood that the MQPUT call 115 is directed to put data on the queue B 140, and at some point later a reply will appear on queue A 130 as a shared reply queue. Details of the WebSphere®. MQ (formerly MQSeries™) Messaging System are well known, for example, from the publication "WebSphere MQ Application Programming Guide".

The MQPUT call 113 is issued only to cause the QMGR to generate a unique CorrelId identifier. This CorrelId can then be used as a unique identifier for replies destined for this session. The reply message that is addressed to the application module 110 can be got from the shared reply queue 130 using the unique ID that was sent with the message in the MQPUT call 115. It will be understood that there are two sequences of calls because the first MQPUT/MQBACK sequence 113/114 gives the unique identifier and the second MQPUT/MQGET sequence 115/116 is the actual piece of work to be achieved; the MQBACK call 114 following the MQPUT call 113 is issued only to undo the unnecessary work performed by the preceding MQPUT call 113.

Although this MQPUT/MQBACK procedure produces a unique identifier, there is no built-in way for a third party (e.g., an administrator or a 'sysprog' module) to correlate this identifier with the particular application instance.

Figure 2:
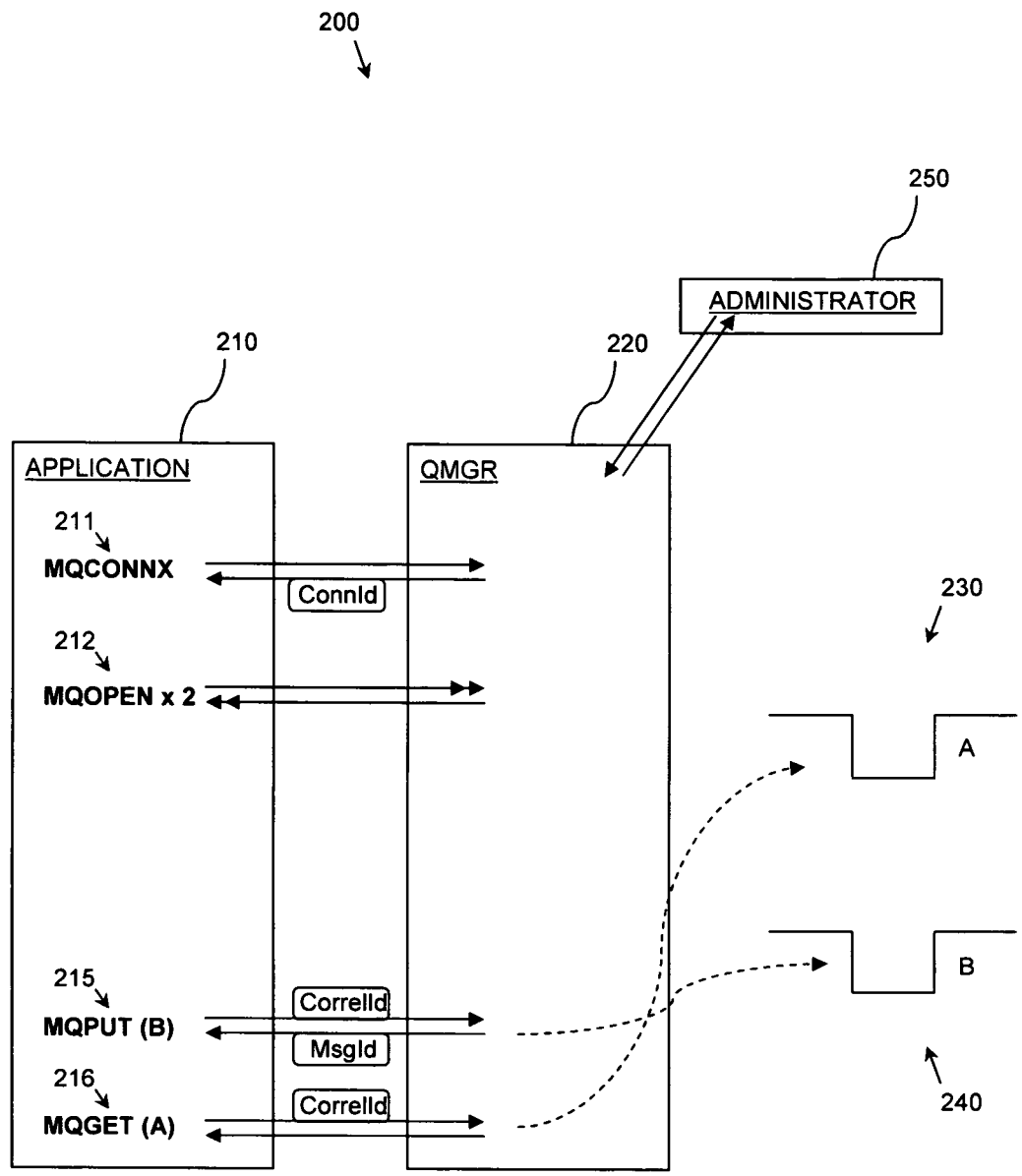
FIG. 2 shows a block-schematic illustration of a method of generating a unique message identifier in accordance with a preferred embodiment of the present invention.

Referring now to FIG. 2, a new and improved technique for generating a unique message identifier in a WebSphere® MQ (formerly MQSeries™) Messaging System 200 relies on communication between an application module 210 and a queue manager module QMGR 220. The application module 210 initially sends an MQCONNX call 211 to (and receives an appropriate confirmation response containing an allocated connection identifier ConnId from) the QMGR module 220. The ConnId is used as a CorrelID, as explained below.

The application module 210 sends two MQOPEN calls 212 to (and receives appropriate confirmation responses from) the QMGR module 220. The application module 210 then sends an MQPUT call 215 to the QMGR module 220; the MQPUT call 215 includes a payload (containing message data) and the MQPUT call also includes a CorrelId (which is the ConnId received from the earlier call 211 to MQCONNX) and a queue identifier B to put the data on a queue B 240. The application module 210 then receives an appropriate confirmation response from the QMGR module 220.

Figure 3:
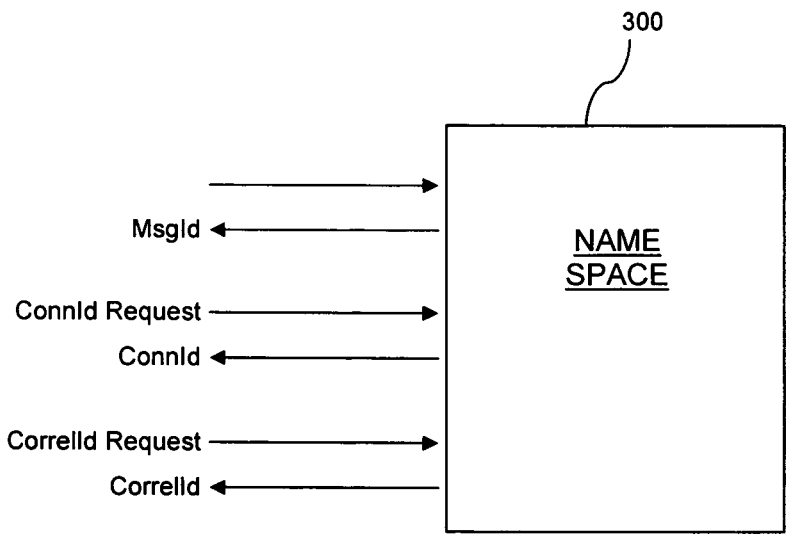
FIG. 3 shows a block-schematic illustration of a method of generating a message identifier and a correlation identifier from the same name space as used in the method of FIG. 2.

Referring now also to FIG. 3, the queue manger 220 allocates the ConnId and a message identifier (MsgId) from the same name space 300 (after receiving an MsgId request and a ConnID request respectively), ensuring that both the ConnId and the MsgId are unique. Thus, when a connection to the queue manager is established, and the queue manager allocates a Connection Identifier from the same name space as Message Identifiers and returns this information to the user, the user can then use this ConnId as a CorrelId (e.g., in a subsequent MQPUT call 215—including a queue identifier B to put the data on queue B 240), safe in the knowledge that it will not clash with any system generated message identifier or correlation identifier. A secondary benefit to this allocation scheme is that messages using a ConnId as a CorrelId can be associated with the connection that initiated the request, for example if a shared reply queue suffers from a build-up of messages then the CorrelId in those messages can be used to identify the application expected to receive those messages. If the application so wishes it can request further unique CorrelId's, which can be generated from the same name space 300.

Thus, use of this allocation scheme allows an administrator 250 to query the queue manager QMGR module 220 to track messages queued by their unique MsgId or ConnId.

Figure 4:
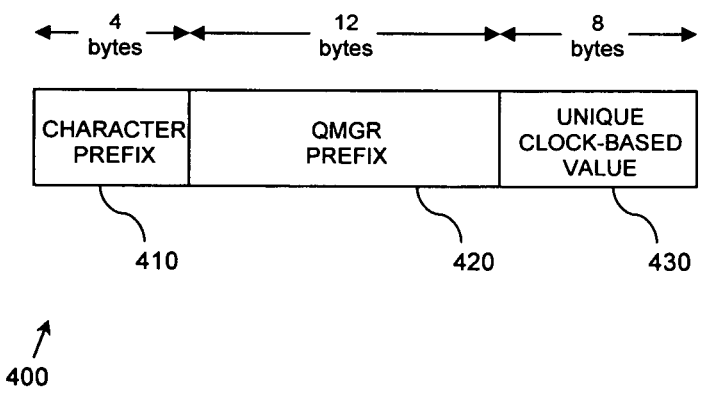
FIG. 4 shows a block-schematic illustration of an identifier used in the method of FIG. 2.

Referring now also to FIG. 4, the MQCNO connect options structure passed on an MQCONNX call is extended to include an MQBYTE24 ConnId 400. The 24-byte call structure 400 includes a 4-byte character prefix field 410, a 12-byte queue manager prefix field 420 and an 8-byte unique clock-based value field 430. The queue manager 220 allocates a unique clock-based value and returns it in the field 430 as a unique ConnId identifier. In the novel identifier allocation scheme described above, the 4-byte character prefix field 410 is used to carry a predetermined character identifier, for example, "AMQC", (different from character strings such as "AMQ", "CSQ", "AMQX" or "AMQY" that may conventionally be contained in this field) to indicate that the field 430 contains a unique ConnId identifier. In this way, the MQCNO connect options structure can be identified (for example, by the administrator 250) as being associated with unique ConnId identification. It will, of course be appreciated that the character string "AMQC" may be affixed as a suffix rather than as a prefix.

It will be appreciated that the unique identifier allocation scheme described above is carried out in software running on a processor in one or more computers, and that the software may be provided as a computer program element carried on any suitable data carrier (not shown) such as a magnetic or optical computer disc.

It will be understood that the unique identifier allocation scheme described above provides the advantage that a user can use a Connection Identifier as a Correlation Identifier, safe in the knowledge that it will not clash with any system generated message identifier or correlation identifier. A secondary benefit to this scheme is that if a shared reply queue suffers from a build up of messages then the Correlation Identifier in those messages can be used to identify the application expected to receive those messages.

We claim:

1. A method of identifier allocation in a messaging system, the method comprising:
   receiving a message queue connection request in a message queuing messaging system executing in memory by a processor of a computer;
   responsive to the request, allocating in the message queuing messaging system a message identifier from a predetermined name space, and
   additionally allocating in the message queuing messaging system a connection identifier from said predetermined name space.

2. The method of claim 1 wherein the messaging system comprises a message queue messaging system.

3. The method of claim 2 wherein the messaging system comprises a queue manager for allocating said message identifier and for allocating said connection identifier.

4. The method of claim 1 wherein the allocated connection identifier is conveyed in a data structure including a predetermined affix.

5. The method of claim 4 wherein said predetermined affix comprises a character prefix "AMQC".

6. The method of claim 1 further comprising allocating a correlation identifier from said predetermined name space.

7. A messaging system including identifier allocation, the system comprising:
   a computer comprising a processor and memory;
   a messaging system executing in the memory by the processor of the computer;
   means for receiving a message queue connection request in the messaging system;
   means for responsive to the request, allocating in the messaging system a message identifier from a predetermined name space, and
   means for additionally allocating in the messaging system a connection identifier from said predetermined name space.

8. The system of claim 7 wherein the messaging system comprises a message queue messaging system.

9. The system of claim 8 wherein the means for allocating is comprised in a queue manager.

10. The system of claim 7 wherein the allocated connection identifier is arranged to be conveyed in a data structure including a predetermined affix.

11. The system of claim 10 wherein said predetermined affix comprises a character prefix "AMQC".

12. The system of claim 7 further comprising means for allocating a correlation identifier from said predetermined name space.

13. A computer readable storage memory embodying computer software instructions for controlling a computer to perform a method of identifier allocation in a messaging system, comprising:
   instructions for receiving a message queue connection request in a message queuing messaging system executing in memory by a processor of a computer;
   instructions for responsive to the request allocating in the message queuing messaging system a message identifier from a predetermined name space, and
   instructions for additionally allocating in the message queuing messaging system a connection identifier from said predetermined name space.

14. The storage medium of claim 13 further comprising instructions for conveying the allocated connection identifier in a data structure including a predetermined.

15. The storage medium of claim 14 wherein said predetermined affix comprises a character prefix "AMQC".

16. The storage medium of claim 13 further comprising instructions for allocating a correlation identifier from said predetermined name space.

\* \* \* \* \*